US012647626B2

(12) United States Patent
Sloss

(10) Patent No.: US 12,647,626 B2
(45) Date of Patent: Jun. 2, 2026

(54) COMPUTER-IMPLEMENTED SYSTEM AND METHOD FOR PROVIDING A STREAM OR PLAYBACK OF A LIVE PERFORMANCE RECORDING

(71) Applicant: Glenn Sloss, Joondalup (AU)

(72) Inventor: Glenn Sloss, Joondalup (AU)

(73) Assignee: Glenn Sloss, Joondalup (AU)

( * ) Notice: Subject to any disclaimer, the term of this patent is extended or adjusted under 35 U.S.C. 154(b) by 0 days.

(21) Appl. No.: 18/851,741

(22) PCT Filed: Mar. 30, 2023

(86) PCT No.: PCT/AU2023/050236
§ 371 (c)(1),
(2) Date: Sep. 27, 2024

(87) PCT Pub. No.: WO2023/183977
PCT Pub. Date: Oct. 5, 2023

(65) Prior Publication Data
US 2025/0211802 A1 Jun. 26, 2025

(30) Foreign Application Priority Data

Mar. 31, 2022 (AU) ................................ 2022900850

(51) Int. Cl.
| | |
|---|---|
| *H04N 21/2187* | (2011.01) |
| *G02B 27/01* | (2006.01) |
| *G06F 16/735* | (2019.01) |
| *G06F 16/75* | (2019.01) |
| *H04N 21/2543* | (2011.01) |

(Continued)

(52) U.S. Cl.
CPC ....... *H04N 21/2187* (2013.01); *G02B 27/017* (2013.01); *G06F 16/735* (2019.01); *G06F 16/75* (2019.01); *H04N 21/2543* (2013.01); *H04N 21/2662* (2013.01); *H04N 21/44204* (2013.01); *G02B 2027/0178* (2013.01)

(58) Field of Classification Search
CPC ........... H04N 21/2187; H04N 21/2543; H04N 21/2662; H04N 21/44204; G06F 16/75; G06F 16/735; G02B 27/017; G02B 27/0178
See application file for complete search history.

(56) References Cited

U.S. PATENT DOCUMENTS

| | | |
|---|---|---|
| 8,230,343 B2 | 7/2012 | Logan et al. |
| 8,997,167 B1 | 3/2015 | Bliss et al. |
| 11,290,762 B2 | 3/2022 | Christie et al. |

(Continued)

OTHER PUBLICATIONS

International Search Report for corresponding International Application No. PCT/AU2023/050236, dated Jun. 19, 2023, 9 pages (for informational purposes only).

*Primary Examiner* — Yassin Alata
(74) *Attorney, Agent, or Firm* — VIERING, JENTSCHURA & PARTNER mbB

(57) ABSTRACT
The present disclosure relates to a computer-implemented system and method for providing streams and playbacks of video and audio recordings in respect of artist performances before live audiences. In particular, the disclosure relates to a system and method of providing a stream or playback of video and audio recordings captured in respect of an artist's live performance to users located around the world in exchange for a fee, with particular limitations placed upon access to the recording until the fee is paid.

20 Claims, 7 Drawing Sheets

(51) Int. Cl.
    *H04N 21/2662*     (2011.01)
    *H04N 21/442*      (2011.01)

(56)              References Cited

U.S. PATENT DOCUMENTS

| | | | |
|---|---|---|---|
| 2013/0239134 | A1 | 9/2013 | Lajoie et al. |
| 2015/0245103 | A1 | 8/2015 | Conte |
| 2019/0058906 | A1 | 2/2019 | Wood |
| 2019/0111343 | A1 | 4/2019 | Payzer et al. |
| 2020/0413136 | A1 | 12/2020 | Kunduru et al. |
| 2022/0012285 | A1 | 1/2022 | Maharajh et al. |

COMPUTER-IMPLEMENTED SYSTEM AND METHOD FOR PROVIDING A STREAM OR PLAYBACK OF A LIVE PERFORMANCE RECORDING

CROSS-REFERENCE TO RELATED APPLICATIONS

This application is a 371 U.S. National Phase of PCT International Patent Application No. PCT/AU2023/050236 filed on Mar. 30, 2023, which claims priority from Australian Provisional Patent Application No. 2022900850 dated Mar. 31, 2022, the disclosures of which are incorporated by reference herein in their entirety for all purposes.

FIELD OF THE INVENTION

The present disclosure relates to a system and method for providing streams and playbacks of video and audio recordings in respect of artist performances before live audiences. In particular, the disclosure relates to a system and method of providing a stream or playback of video and audio recordings captured in respect of an artist's live performance to users located around the world in exchange for a fee, with particular limitations placed upon access to the recording until the fee is paid.

BACKGROUND OF THE INVENTION

The way in which the live performance of an artist is recorded and played back to audiences in an online environment can have a significant effect upon the success of the recording, and hence the success of artist and the artist's reputation. Accordingly, there is pressure on the artist to not only be entertaining and to perform at a high level, but to also ensure that their performance is captured and produced with sufficiently high quality video and audio. In other words, it is well understood that the ability to consistently produce high quality productions is necessary to establish and maintain the reputation of a live performing artist.

However, producing high quality video and sound recordings of live performances is an expensive process which is generally difficult for artists to achieve since they generally do not have the funds, at least initially, to afford the necessary recording equipment and infrastructure required to publish high quality live streams or playbacks for members of the general public to stream and/or download (e.g. for a fee). As a result, even if an artist is very talented and captures a very entertaining performance, the broadcasting of such performances generally receive less favourable feedback as compared with performances that are produced with higher quality audio and video.

In this regard, the gold standard for audio and video is considered to be audio played at approximately 192 KHz/24-bit and video streamed at a bitrate of at least 4,500 kbps. Further, the ultimate experience in viewing a live performance such as a concert (eg. via a live stream or playback of the recording) is using smart glasses which provides the viewer with a fully immersive experience. The use of smart glasses enables the viewer to feel as though they are physically present at the live performance. At present, the production and streaming of concerts is not achieved in a manner that enables viewers to utilize smart glasses to enhance their viewing experience.

Accordingly, there is a need to provide artists with an opportunity to record their performances and have their recordings produced and viewed by as many viewers as possible, in a manner that creates a more equal playing field amongst artists. In other words, there is a need for artist recordings to be produced and broadcast with sufficient quality as widely as possible in order to capture audiences beyond those attending the actual live performance, and thereby enabling the generation of the revenue required to justify the capture and streaming of high-quality audio and video in respect of their live performances. However, potential viewers who are not present at the live performance (possibly due to their location being a significant geographical distance from the live performance) are understandably reluctant to pay a significant fee to view the stream without some assurance that the experience is one which they consider to be worthwhile.

Accordingly, there exists a need for a system and method that addresses or at least ameliorates some of the above-mentioned problems.

The reference to any prior art in this specification is not, and should not be taken as, an acknowledgement or any suggestion, that the prior art forms part of the common general knowledge.

SUMMARY OF THE INVENTION

In one aspect, the present disclosure provides a computer-implemented method for providing high quality streams or playbacks of live performance recordings, the method including, receiving, by one or more processors, a user request for a stream or playback of a video and audio recording of a live performance of one or more artists in a format suitable for replaying the stream or playback using smart glasses associated with the user, the smart glasses having a display unit configured to provide the user with an immersive display of the video and audio recording that is streamed or played back using the smart glasses, and in response to the request, the one or more processors configured to communicate with the smart glasses to provide a limited stream or playback of the recording to the user seeking to view the performance using the smart glasses, requesting, by one or more processors, a fee in exchange for providing an unlimited stream or playback of the recording, and based upon confirmation that the fee has been paid by the user, providing, by one or more processors, an unlimited stream or playback of the recording of the performance to the smart glasses associated with the user.

In a non-limiting embodiment, when a stream of the video and audio recording is requested, the stream is provided to the smart glasses without copying and saving the recording onto a database associated with the smart glasses.

In a non-limiting embodiment, when a playback of the video and audio recording is requested, the playback is provided to the smart glasses by enabling the smart glasses to download and save the playback onto a database associated with the smart glasses.

In a non-limiting embodiment, the limited stream or playback is restricted in respect of one or more of, time of the video and audio recording, and quality of the video and audio recording.

Accordingly, the computer-implemented system and method provides the infrastructure to enable live performances to be broadcast to viewers in a live stream or playback, and where the limited stream may be limited in respect of time and/or quality of the video/audio (for example) prior to receipt of the requested fee. In this regard, an improved quality live stream or playback may be provided to smart glasses associated with a user in return for the fee. In another embodiment, the limited stream provides a limited time in which the user may experience the live performance before payment of a fee is required and in time to receive the stream.

By providing the live stream or playback directly to smart glasses and in a configuration that corresponds with the particular smart glasses of the user, the system and method provides a viewing experience in a manner that is much more closely aligned with the "live" experience of the person attending the concert. As a result, the closely related experience of attending the live performance for users who are geographically distant from the venue of the live performance affords the ability for a larger number of people to share the "live" experience of the artist's performance without requiring the user to be physically present at the venue.

In a non-limiting embodiment, the one or more processors are associated with a central server configured to communicate with one or more devices operable to execute a software application that enables communication with the central server, the devices including one or more of, the smart glasses worn by users to view streams or playbacks of video and audio recordings of live performances, data communications devices associated with said users, and data communications devices and/or video and audio capture devices associated with said one or more artists.

In a non-limiting embodiment, the video and audio recording is captured using the video and audio capture device associated with the one or more artists and subsequently received by the central server and stored in a library of video and audio recordings.

In a non-limiting embodiment, the method further includes indexing, by one or more processors, the stored library of video and audio recordings such that each recording includes a description that enables the recordings to be classified according to one or more of, artist, location of the live performance, category of performance, number of streams requested by users, and number of playbacks requested by users.

In a non-limiting embodiment, the method further includes, providing, by one or more processors, a searching facility that enables users to utilise their smart glasses and/or associated data communications devices to search for recorded live performances in the indexed library based on a search query.

In a non-limiting embodiment, the method further includes generating search results in response to the search query.

In a non-limiting embodiment, when the search query includes one or more keywords, the search results include a subset of the stored video and audio recordings that have a description including one or more words, numbers, symbols or characters that substantially match the keyword(s) searched according to a similarity threshold.

In a non-limiting embodiment, when the search query specifies a filter to be applied to the search results based on the classification of each recording, the search results include a subset of the stored video and audio recordings that are selected in accordance with the filter specified by the user.

In a non-limiting embodiment, the stream is a live stream based on video and audio being recorded and subsequently streamed by the one or more processors in substantially real-time.

In a non-limiting embodiment, the method further includes, providing, by one or more processors, notifications to smart glasses and/or data communications devices associated with users regarding the receipt of recordings of live performances.

In a non-limiting embodiment, the receipt of notifications is based upon preferences of the user including preferences relating to artists of particular interest.

In a non-limiting embodiment, notifications are issued to smart glasses and/or data communications devices of users by one or more of, smart glass display message, push notification, text message, and email.

In a non-limiting embodiment, when a new recording is received, the recording is processed by implementing a cognitive modelling tool to automatically adjust the recording to improve video and/or audio quality for subsequent viewing on smart glasses, where both an original and improved quality recording is stored to enable the original recording to be provided in the limited stream or playback and the improved quality recording to be provided in the unlimited stream or playback. In this regard, the improved quality recording may include video streamed at a bitrate of at least 4,500 kbps and audio played at approximately 192 KHz/24-bit.

In a non-limiting embodiment, the method further includes, generating, by one or more processors, analytical data for each user which enables subsequent analysis of the data to determine one or more of, most popular artists, most popular performance categories, most popular methods of viewing recordings, most active users viewing streamed and/or played back recordings, most active locations for viewing streams and/or playbacks, and profiles of viewing audiences regarding streamed and/or played back recordings of live performances. This will provide a detailed understanding regarding viewing audiences for particular artists, performance categories, etc.

In a non-limiting embodiment, the analytical data includes at least a geo-location and geographical movements of each user according to GPS location functionality associated with smart glasses and/or a data communications device of each user.

In a non-limiting embodiment, the smart glasses include augmented reality 3D smart glasses.

In a second aspect, the present disclosure provides a system for providing high quality streams or playbacks of live performance recordings, the system including one or more processors that, receive a user request for a stream or playback of a video and audio recording of a live performance of one or more artists in a format suitable for replaying the stream or playback using smart glasses associated with the user, the smart glasses having a display unit configured to provide the user with an immersive display of the video and audio recording that is streamed or played back using the smart glasses, and in response to the request, the one or more processors configured to communicate with the smart glasses to provide a limited stream or playback of the recording to the user seeking to view the performance using the smart glasses, request a fee in exchange for providing an unlimited stream or playback of the recording, and based upon confirmation that the fee has been paid by the user, provide an unlimited stream or playback of the recording of the performance to the smart glasses associated with the user.

In a third aspect, the present disclosure provides a computer-readable medium that when executed on a computer, causes one or more processors of the computer to perform steps to provide high quality streams or playbacks of live performance recordings, including, receiving a user request for a stream or playback of a video and audio recording of a live performance of one or more artists in a format suitable for replaying the stream or playback using smart glasses associated with the user, the smart glasses having a display unit configured to provide the user with an immersive display of the video and audio recording that is streamed or played back using the smart glasses, and in response to the request, the one or more processors configured to communicate with the smart glasses to provide a limited stream or playback of the recording to the user seeking to view the performance using the smart glasses, requesting a fee in exchange for providing an unlimited stream or playback of the recording, and based upon confirmation that the fee has been paid by the user, providing an unlimited stream or playback of the recording of the performance to the smart glasses associated with the user.

In a fourth aspect, the present disclosure provides a portable electronic device for use by a user seeking to be provided with high quality streams or playbacks of live performance recordings, the device including, a means of communicating with smart glasses associated with the user, a touch screen configured to receive an input corresponding to a touch operation of the user on an area of the touch screen, and a processor connected to the touch screen, wherein the processor is configured to detect the input to the touch screen and perform operations including, detecting a first input, via the touch screen, of a request from the user for a stream or playback of a video and audio recording of a live performance of one or more artists in a format suitable for replaying the stream or playback using the smart glasses associated with the user, the smart glasses having a display unit configured to provide the user with an immersive display of the video and audio recording that is streamed or played back using the smart glasses, and in response to the request, communicating with the smart glasses to provide a limited stream or playback of the recording to the user seeking to view the performance using the smart glasses, providing, for display on the touch screen, a request to the user for payment of a fee in exchange for providing an unlimited stream or playback of the recording, detecting a second input, via the touch screen, of an input by the user confirming that the fee has been paid by the user, and providing an unlimited stream or playback of the recording of the performance to the smart glasses associated with the user.

BRIEF DESCRIPTION OF THE DRAWINGS

Embodiments of the invention will now be described in further detail with reference to the accompanying Figures in which.

DETAILED DESCRIPTION OF EMBODIMENT(S) OF THE INVENTION

For simplicity and illustrative purposes, the present disclosure is described by referring to embodiment(s) thereof. In the following description, numerous specific details are set forth to provide a better understanding of the present disclosure. It will be readily apparent, however, that the current disclosure may be practiced without limitation to the specific details. In other instances, some methods and structures have not been described in detail to avoid obscuring the present disclosure.

Figure 1:
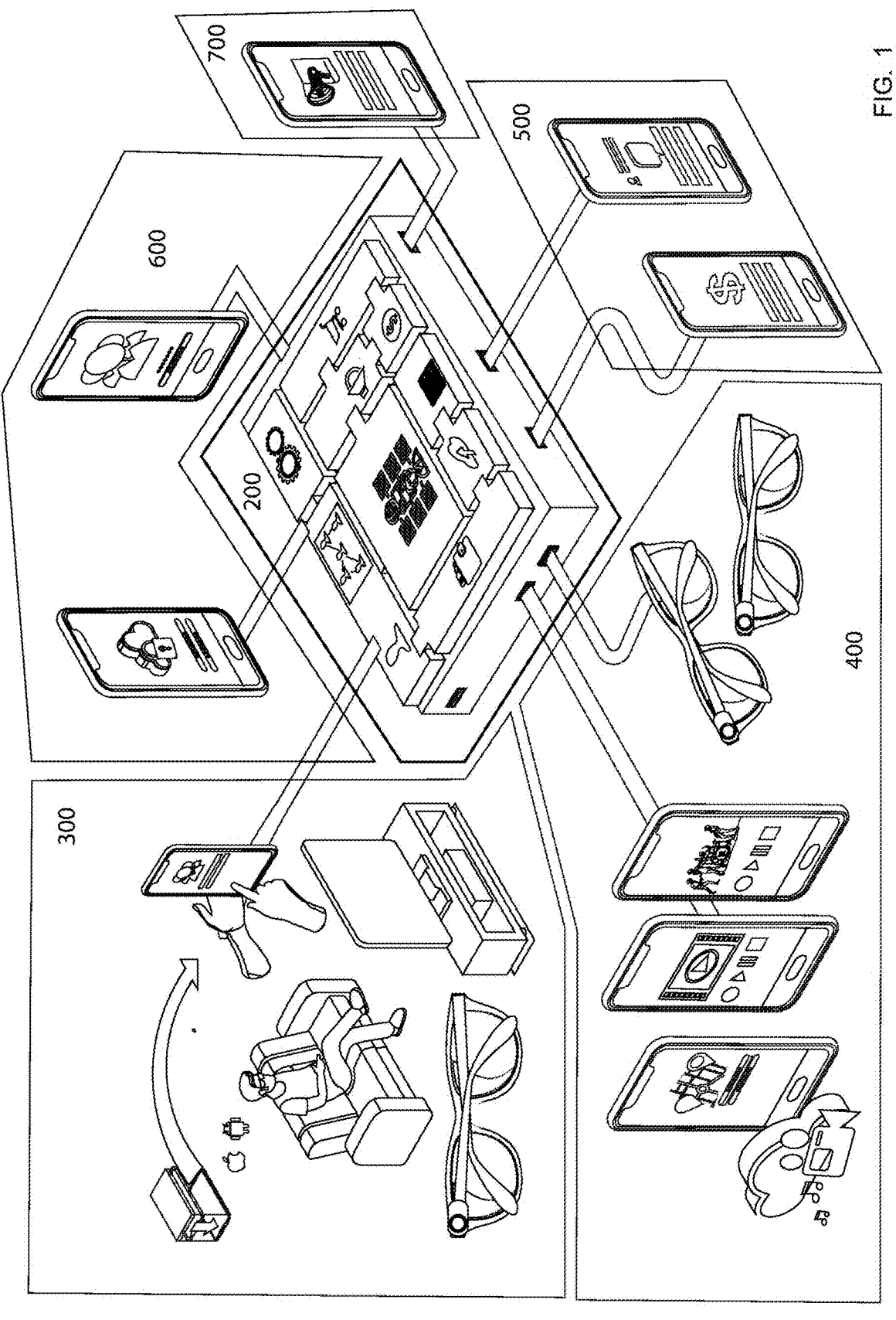
FIG. 1 provides an overview of a system according to a non-limiting embodiment of the present disclosure showing, in particular, interaction between the various system components.

The present disclosure, according to a non-limiting embodiment, relates to a system and method for providing high quality streams or playbacks (90) of live performance recordings to individuals (30) (also referred to herein as users (30)) seeking to view the streams or playbacks (90) in a manner that is highly immersive, (i.e. using smart glasses (60)), as depicted in FIG. 1.

The system and method provides a platform that hosts a computer executable software application (40), wherein the application (40) is accessible by a plurality of such individuals (30), as well as a plurality of artists (70) seeking to provide recordings of their live performances for access online. The platform enables individuals (30) to be provided a limited stream or playback of the recording (90), or upon the payment of a fee, an unlimited stream or playback of the recording (90), directly to the user's smart glasses (60).

The platform is provided by a central server (20) which maintains one or more processors and/or databases for performing functions, including receiving requests for a stream (eg. a live stream) or playback of a video/audio recording (90) of a live performance from one or more artists (70) in a format suitable for replaying the stream using smart glasses (60) (eg. augmented reality 3D smart glasses having a display unit (65)). The server (20) is further configured to provide a "limited" stream or playback of the recording (90) to the individual (30) seeking to view the performance using smart glasses (60), and upon receipt of a fee from the individual (30), subsequently provide an "unlimited" stream or playback of the recording (90).

The skilled addressee will understand the difference between a stream and a playback of a recording (90), with streaming representing a method of viewing video or listening to audio content without downloading the recording (media file), and playback which requires the user to download a copy of the recording onto their device or associated database before being able to view same.

It is to be understood that reference to "limited" and "unlimited" is not necessarily limited to a time period within which users (30) have access to the recordings but may include any other limitation capable of being placed upon a user's access to a stream or playback of the recording (90) (eg. preventing access to a high quality version of the video/audio recording (90) until such time that a viewing fee is paid). Accordingly, the stream or playback may be limited in respect of time and/or quality, amongst other restrictions, prior to receipt of the requested fee.

The person skilled in the relevant field of technology will appreciate that the platform provides a solution to existing problems associated with ensuring that all artists (70) can publish high quality streams or recordings (90) of their performances for viewing by members of the public, irrespective of the status of, or resources available to, the artist (eg. where the recording may be accessed by the public with high quality audio being played at 192 kilohertz/24 bit and video streamed at a bit rate of at least 4500 kbps). This is achieved through the use of a server (20) connected to user devices (50) associated with individuals (30) and their smart glasses (60), wherein the server (20) has access to and/or incorporates a means of adjusting the received recording (90) to improve video and/or audio quality, ensuring best quality for subsequent unlimited access to same via the user's smart glasses (60).

In one example, the server (20) may ensure that a live stream or playback is provided in improved quality by processing the received recording (90) to improve video and/or audio quality by applying a cognitive modelling tool to automatically adjust the recording to improve the video and/or audio quality. Both an original and improved quality recording may be stored to enable the original recording to be provided in the limited stream or playback, and the improved quality recording to be provided in the unlimited stream or playback which is accessible once the relevant fee is paid.

Furthermore, the platform provides individuals (30) with the ability to quickly and efficiently locate media relating to performances of artists (70), and further enables direct communication between users (30), and between users (30) and artists (70).

In view of the above practical and useful results and effects that arise from the described implementation of the present disclosure, the use of smart glasses (60) and associated data communications devices (50) on which the software application (40) is operated represents an advance as compared with existing streaming/playback technologies currently available to individuals.

FIG. 1 is divided into segments which are further expanded in subsequent FIGS. 2 to 7. In particular, Segment 200 of FIG. 1 shows the server component (20) with which a software application (40) operating on data communication devices (50) of each individual (30) and artist (70) are configured to communicate. It will be apparent to the person skilled in the relevant field of technology that the software application (40) may be a mobile application or web application, and similarly, the data communication devices (50) utilized by the individuals (30) and the artists (70) may be portable devices or fixed location computing devices. Examples of portable devices include laptops, mobile phones and tablets, and examples of fixed location computing devices include workstations and personal computers. The server component is additionally detailed in FIG. 2.

The skilled person will further appreciate that the steps described herein may be executed by the devices (50) and/or smart glasses (60), wherein such operations are facilitated via the software application (40) operating on each device (50) and (60). According to another implementation, the server (20) may be programmed to provide all, or most, of the processing functions described herein, where they cannot be provided locally on the user devices (50) or smart glasses (60), or where it may be commercially or technically impractical to implement such arrangements. In other words, the steps described herein as performed by the device (50) or smart glasses (60), or components thereof, may be associated with hardware that is located externally of the devices such as the remote central server (20) for example (i.e. in a distributed architecture).

Segment 300 of FIG. 1 shows how the server (20) may be configured for communication with the devices (50) and smart glasses (60) associated with each user (30). In one example, the server (20) may receive data from the devices (50) for the purpose of creating a user or artist profile, e.g. based upon the entry of details from the individual (30) or artist (70). Segment 300 of FIG. 1 further shows an individual (30) downloading and installing the application (40) and subsequently accessing the application (40) to establish an account and profile, and it is to be understood that artists (70) may also download, install and access the application (40) in a similar manner.

Segment 400 of FIG. 1 shows example interfaces (160) and (170) from the perspective of an artist (70), in which the artist (70) may upload relevant details as well as a recording (90) of a live performance for subsequent access by individuals (30) using the display unit (65) associated with smart glasses (60). Segment 500 of FIG. 1 shows additional example interfaces (180) and (190) in which additional functionality associated with the software application (40) including a payment interface (180) and a chat interface (190) may be accessed by each individual (30) and/or artist (70), as further detailed in FIG. 5. Segment 600 of FIG. 1 shows additional example interfaces (205) and (210) including an interface (205) that enables individuals (30) to access and search a media library (110), and a further interface (210) to enable tracking of user data, as further detailed in FIG. 6. Segment 700 of FIG. 1 shows an additional example interface (220) enabling alerts and/or notifications to be presented to individuals (30) and artists (70) via the software application (40).

As mentioned above, FIG. 2 shows in greater detail Segment 300 of FIG. 1, and in particular, FIG. 2 shows the server component (20) which includes infrastructure upon which the platform of the present disclosure operates. The infrastructure may be local or cloud-based. The central server (20) may operate one or more computer processors and maintain one or more databases to enable the following functionality and/or storage:

User account register (100) storing details relating to all registered individuals (30) as well as all registered artists (70) (e.g. name, address, contact details, and any additional detail which may be relevant for the purpose of identifying each user and artist);

Media library (110) which may store recordings of performances (90) which have been uploaded by artists (70) (both in an original format and any high quality format(s) generated subsequent to processing the recording), as well as any additional media which individuals (30) may prefer to have access to including music videos or the like;

Data processing functionality (115) for managing the receipt of media from artists (70) and the provision of limited/unlimited streaming or playback of audio/video recordings (90) to smart glasses (60) depending on an automatic check of whether payment has been received. The functionality (115) may recognize when individuals (30) have not paid for a particular stream or playback of a recorded performance, thereby preventing the individual (30) from accessing an unlimited stream or playback. When individuals have made the requisite payment with respect to accessing the stream or playback, such individuals (30) are provided unlimited access;

Payment gateway (120) which manages the payment of fees from individuals (30) seeking to access streams or playbacks of recordings from artists, or access to any additional media stored in library (110) that may attract a fee. In addition, the payment gateway (120) manages additional financial aspects including the payment of any subscription fees and the redemption of any points, vouchers, etc. associated with individuals (30);

Admin control and searching functionality (125) which enables management of stored data including media stored in the media library (110). For example, functionality (125) may be responsible for indexing media that is stored in database (110) in order to classify particular recordings (90) according to variables such as artist name, location of the live performance, category of performance, number of streams requested by users, and number of playbacks requested by users, and to thereby facilitate searching thereof by individuals (30);

Media purchasing functionality (130) which may be used to provide a facility to individuals (30), via the software application (40), to make associated purchases including in relation to albums released by particular artists (70), merchandise, or other items that may be made available for purchase.

Figure 2:
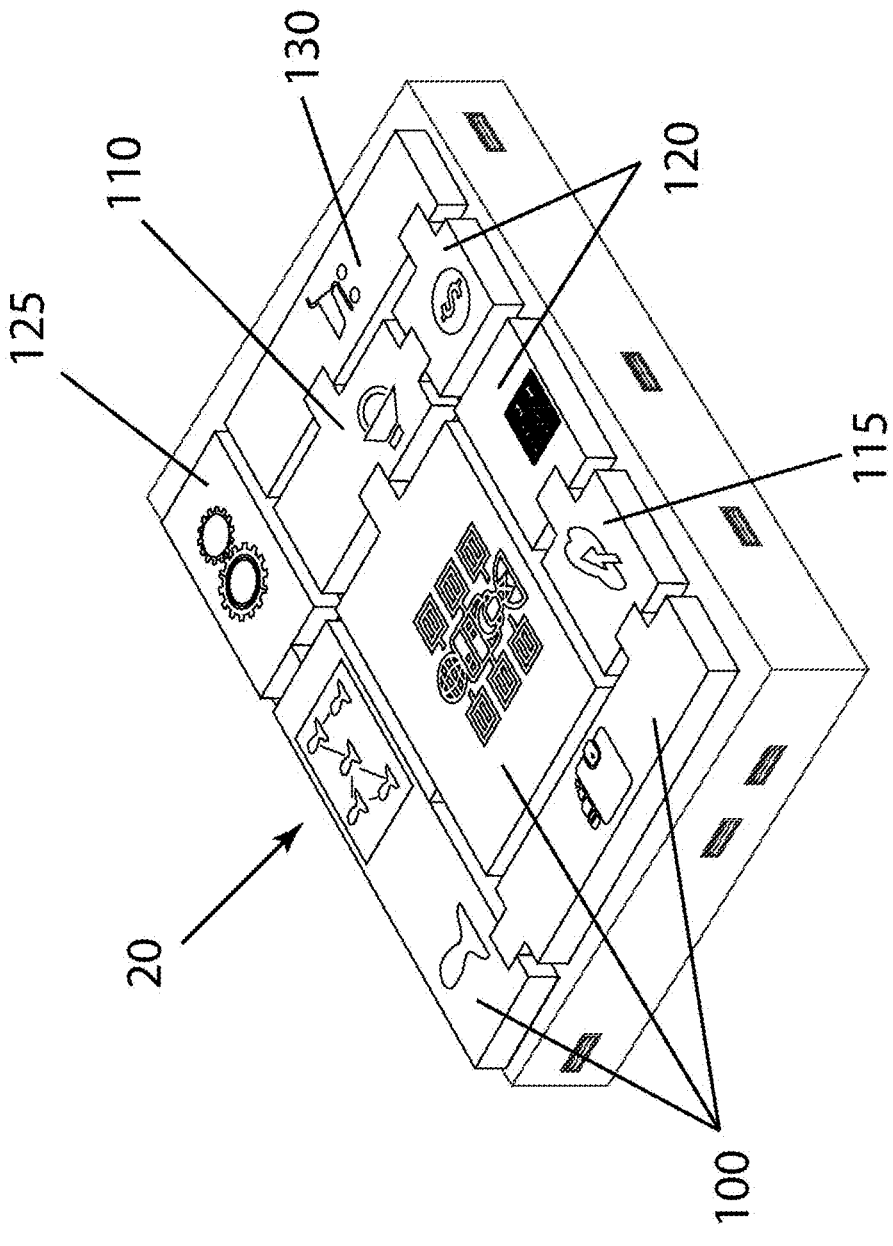
FIG. 2 illustrates a non-limiting diagram associated with the server component within the system illustrated in FIG. 1.

FIG. 2 also depicts that server (20) is configured to enable communication (140) with the devices (50) and smart glasses (60) and, in particular, with the software application (40) operating on each device (50) and (60). Such communications may occur via the internet or similar network.

Figure 3:
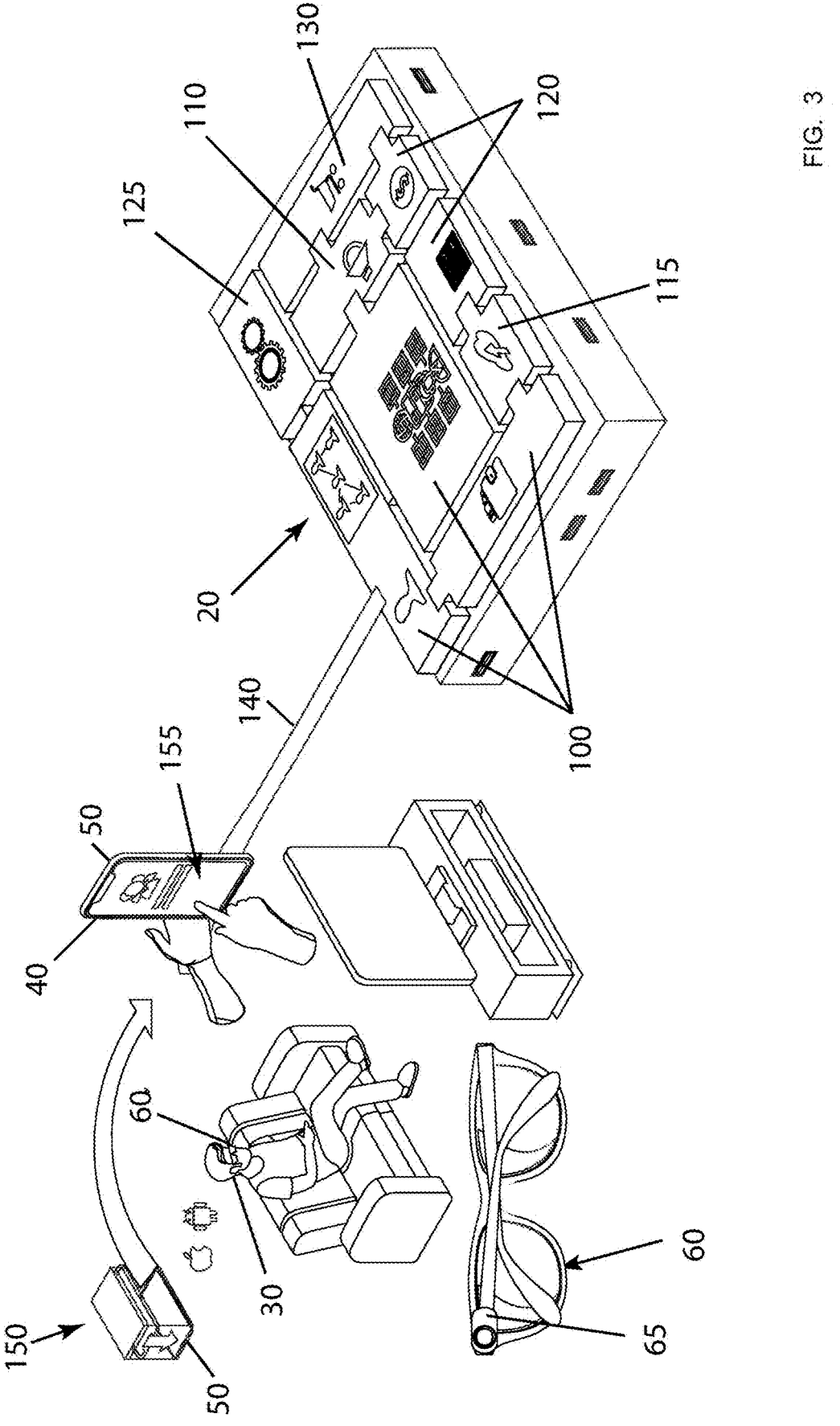
FIG. 3 illustrates a diagram of a process that enables a user to download and install a software application, and subsequently access, or register to use, the software application for interaction with the system illustrated in FIG. 1, including wearing smart glasses for viewing an audio/video stream or playback of a performance recording.

FIG. 3 shows in greater detail Segment 300 of FIG. 1 and, in particular, the steps associated with an individual (30) installing (150) the software application (40) on their device (50) and smart glasses (60), and subsequently accessing a user login and registration interface (155) associated with the application (40) on device (50). Such access may be granted after the individual (30) has installed the application (40) which may be achieved by downloading the application (40) from an application store. Each individual (30) may create an account (which may include a user profile) using the application (40) and the account/profile information may be stored in the user account register (100). A similar process may be undertaken by artists (70) seeking to utilize their own devices (50) to install, access and register to use the software application (40).

By viewing a live stream or playback of a performance recorded by or on behalf of an artist (70) through the display unit (65) of smart glasses (60), individuals (30) are provided a viewing experience in a manner that is much more closely aligned with the "live" experience of a person attending the performance in the real world (e.g. a concert). As a result, the closely related experience of attending the live performance for users who are geographically distant from the venue of the live performance affords the ability for a larger number of people to share the "live" experience of an artist's performance without requiring the individual (30) to be physically present at the venue, including in the comfort of their own living room, as shown in FIG. 3.

Figure 4:
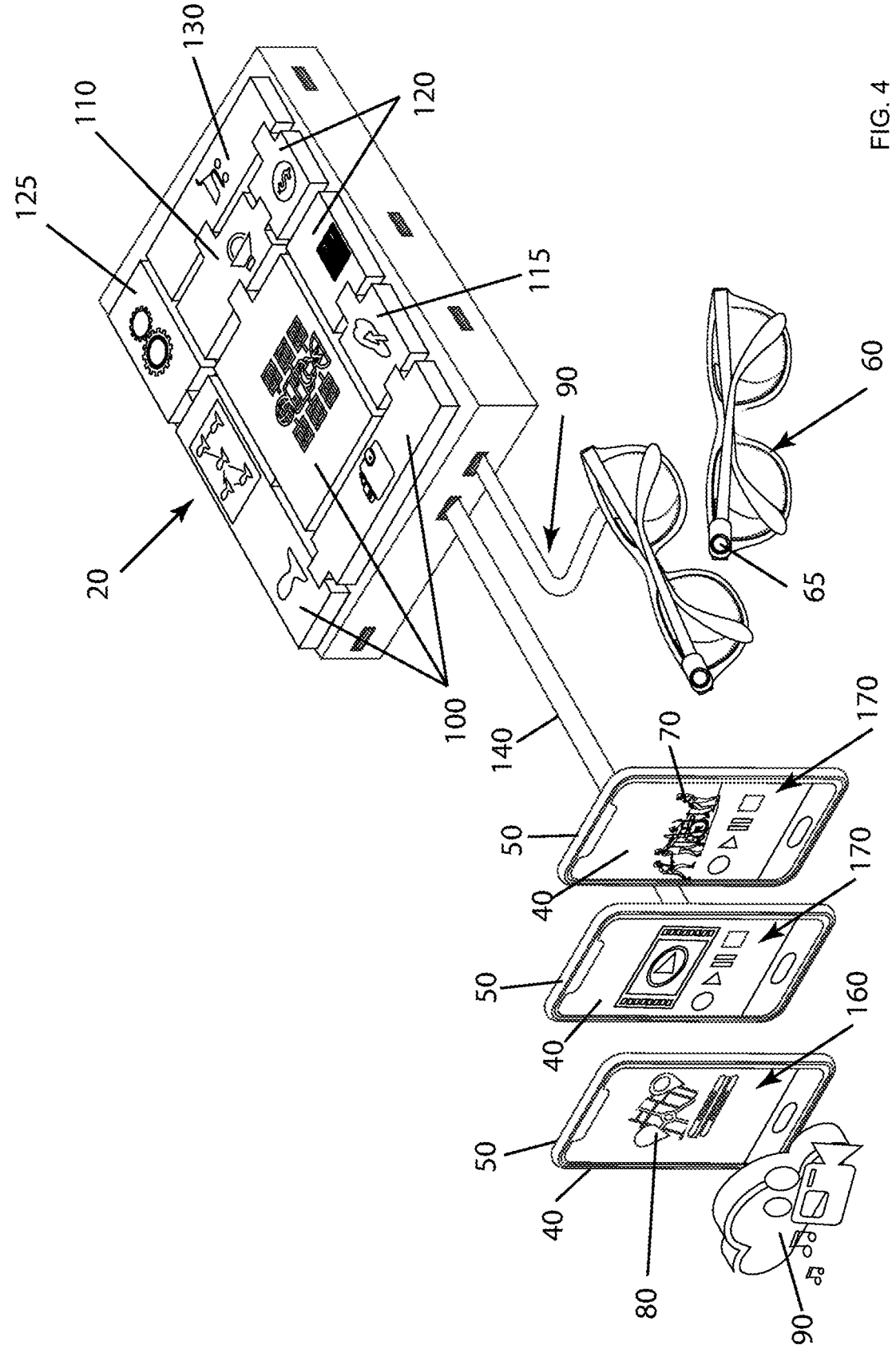
FIG. 4 illustrates a diagram associated with non-limiting interfaces of the software application from the perspective of an artist, including interfaces for entry of a performance location, and upload of an audio/video recording for subsequent streaming or playback using smart glasses of individuals seeking to view the performance.

FIG. 4 shows in greater detail Segment 400 of FIG. 1 and, in particular, the steps associated with an artist (70) uploading information and data relating to their performance including, for example, the location (80) of their performance (as shown in interface (160)) and a recording (90) of their performance as shown in interfaces (170). In this regard, whilst a performance may be recorded using a mobile device of the artist (70), other video/audio capture devices (not shown) may also be utilised and which may be configured for direct communication (140) with the server (20). Once a recording (90) is received by the server (20), the server (20) may take automatic steps to assess the quality of the received media and, if necessary, make improvements to the audio and or video associated with the received recording so that the recording to immediately available for unlimited streaming (including live streaming for example) and/or playback. Alternatively, the server (20) may transmit the media to an external hardware system that may be better equipped or capable of improving the quality of the audio and/or video associated with the received recording. As previously described, both the originally received and the improved quality versions of the recordings may be stored, and the most appropriate one may be selected for access depending upon the status of the requesting user and in particular whether the requesting user has paid the relevant access fee.

In one example, the server (20) may be equipped to perform one or more cognitive modelling techniques for reducing background noise associated with received audio/video, or improving the audio/video such that the recording may be presented in a manner that satisfies a minimum quality threshold. In this regard, and as also described earlier, the preferred standard for audio and video is considered to be audio played at approximately 192 KHz/24-bit and video streamed at a bit rate of at least 4500 kbps. The server (20) may be configured to ensure that any recording is at least improved to this level of quality, although other quality parameters may be defined by users (30) and/or artists (70) and/or an administrator of the platform. In an example, the server (20) may be configured by the administrator of the platform to lower the particular standard or set an acceptable quality range.

Where particular media received from artists (70) is incapable of conversion such that the result satisfies the minimum quality threshold, then the artist (70) may be requested to provide a further recording (90). Where the recording (90) is to be provided as a "live stream" to the public, then any quality improvements to the audio/and or video will need to be performed in substantially real-time and, again, the server (20) or any other third party hardware will be equipped to perform such quality improvements.

Figure 5:
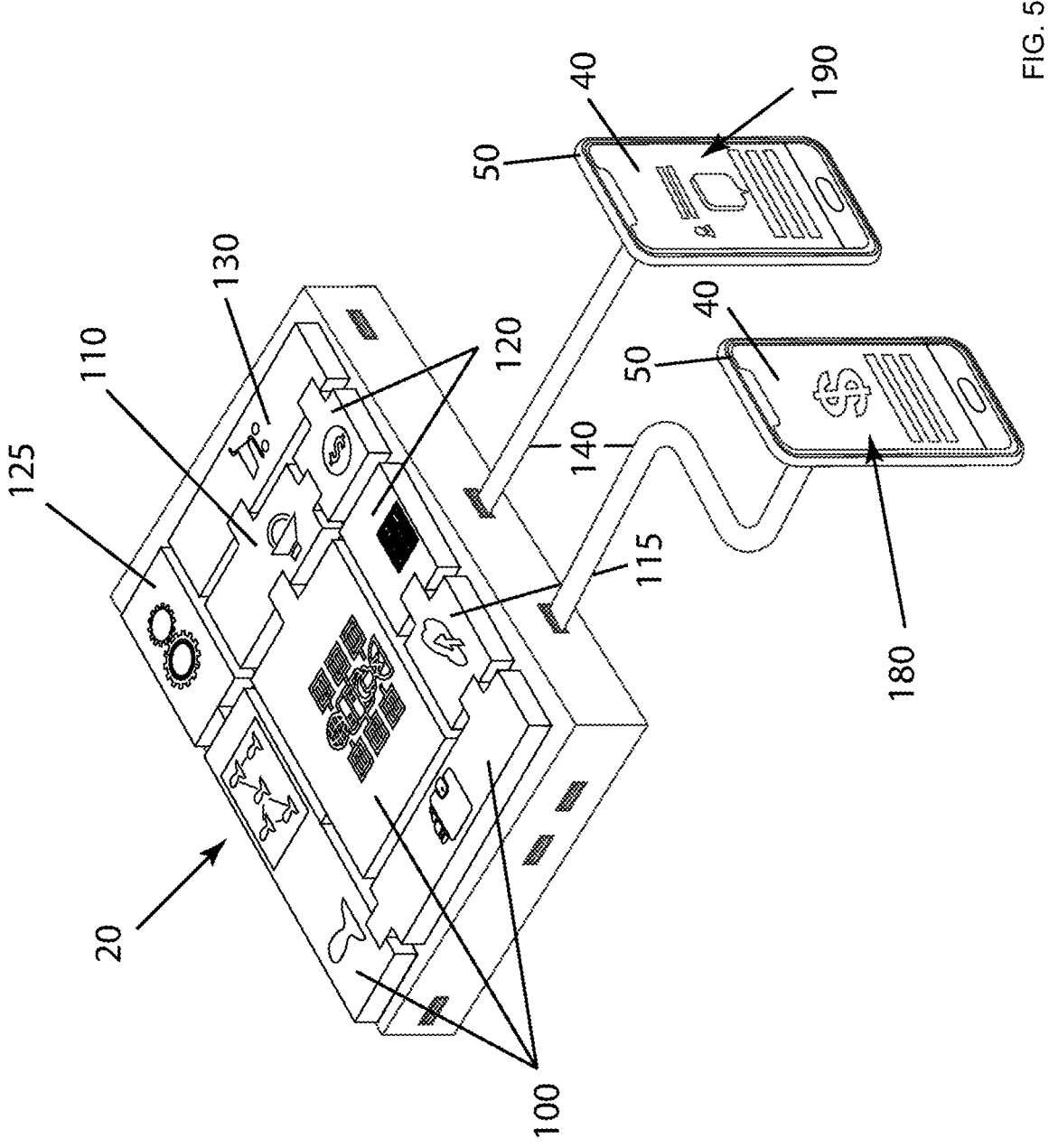
FIG. 5 illustrates a non-limiting diagram associated with non-limiting interfaces of the software application from the perspective of a registered user seeking to stream or playback recordings of performances using their smart glasses, including an interface for enabling payments to be made to access an unlimited stream, as well as a chat interface.

FIG. 5 shows in greater detail Segment 500 of FIG. 1 and, in particular, an interface (180) in which individuals (30) are prompted to make payments in exchange for being provided an unlimited stream or playback of a recording (90). Based upon receipt of the requisite fee, the individual (30) may be provided, via their smart glasses (60), an unlimited stream of the recording of their selected performance. In this way, the platform provides the infrastructure to enable "live" performances to be broadcast to viewers in a stream (including live streams) or a playback, and where the limited stream (prior to a fee payment) may be limited in respect of time and/or quality or other attribute of the video/audio. Based upon receipt of a fee by the individual (30), an improved stream or playback is provided in which the previous restrictions and/or limitations with respect to time, quality, etc, have been removed.

In one example, the limited stream provides a limited time in which the individual (30) may experience the live performance (including in high quality) before payment of a fee is required. Of course, individuals (30) may provide payment in anticipation of a live stream of a performance, thereby ensuring that as soon as the live stream becomes available, the individual (30) will be entitled to receive a non-limited live stream through their smart glasses (60) without delay.

The interface (180) may also be utilized to manage other payments from individuals (30) in relation to subscription fees relating to use of the software application (40), and any additional purchases relating to additional media and/or merchandise available for purchase from particular artists (70).

FIG. 5 also shows an interface (190) which provides a chat facility for registered users to enable communications between individuals (30) who have accessed the same performance, or even live chat sessions with the artist (70).

Figure 6:
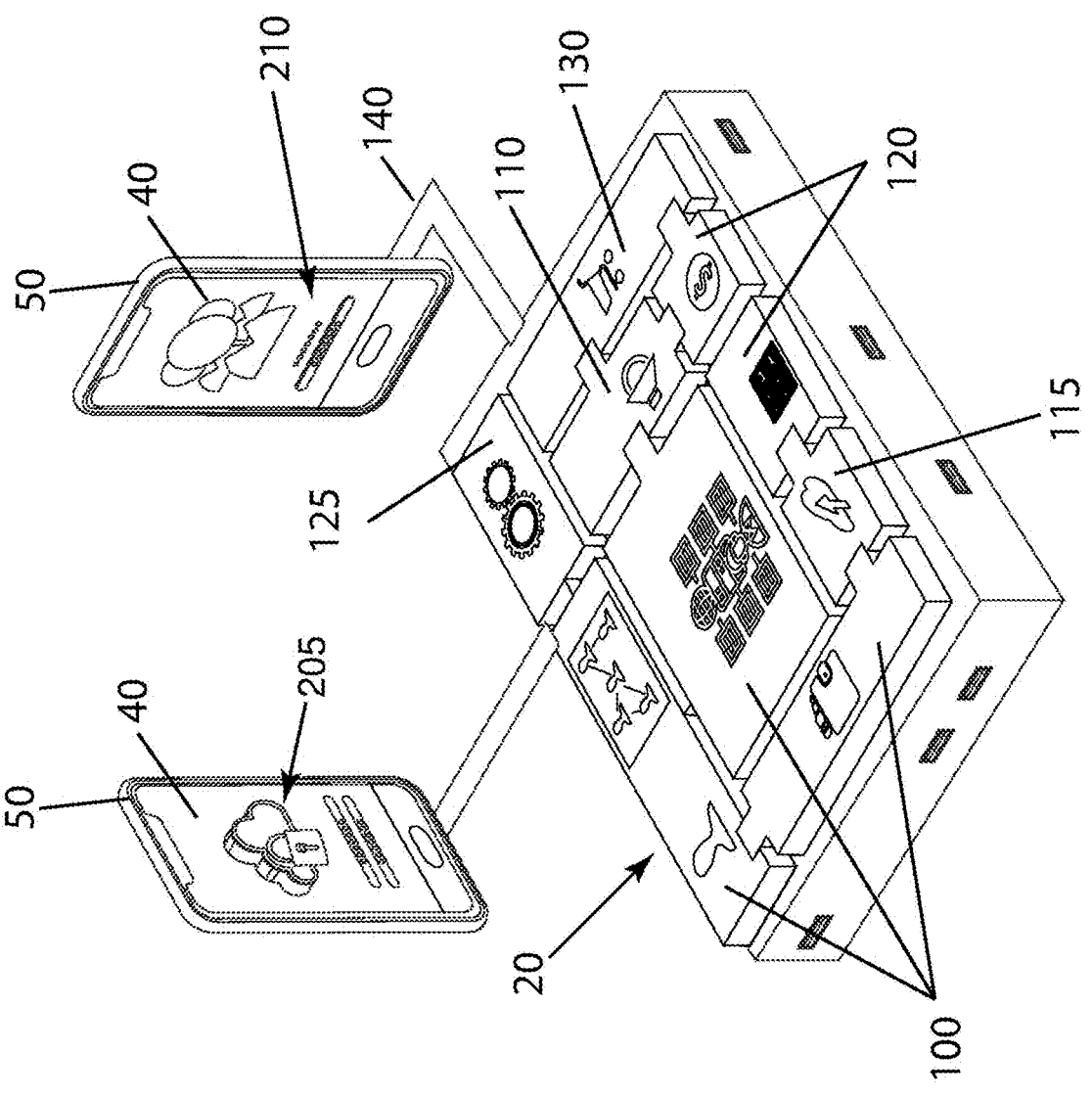
FIG. 6 illustrates a non-limiting diagram associated with additional interfaces of the software application including an interface that enables individuals to access and search a music library, and a further interface that enables user data to be tracked and stored for analytical purposes.

FIG. 6 shows in greater detail Segment 600 of FIG. 1 and, in particular, a further interface (205) associated with software application (40) which enables individuals (30) to access a library of video and audio available for streaming and/or video and audio available for download. For example, a library of music videos and recordings of live performances of artists (70) may be stored in database (110) and indexed, using functionality (125), such that each recording or music video includes a description that enables the media to be classified according to one or more variables such as artist name, location of the live performance, category of the performance, number of views requested by users (indicating the popularity of the particular recording), etc. Interface 200 may thereby provide a search facility for individuals (30) to enable the individuals (30) to quickly and efficiently search for particular live performances, including based upon key words and/or filters relating to the same or similar variables as those described above.

FIG. 6 also shows an interface (110) that enables user data (including location data based upon global positioning system (GPS) monitoring) to be tracked and stored for analytical purposes. In this regard, gathering data from individuals (30) regarding their geo-location and geographical movements according to GPS functionality associated with the user devices (50) may enable subsequent analysis to determine profiles of viewing audiences regarding streamed or played back recordings of live performances. Such data may also provide a detailed understanding regarding viewing audiences for particular artists, performance categories etc.

Figure 7:
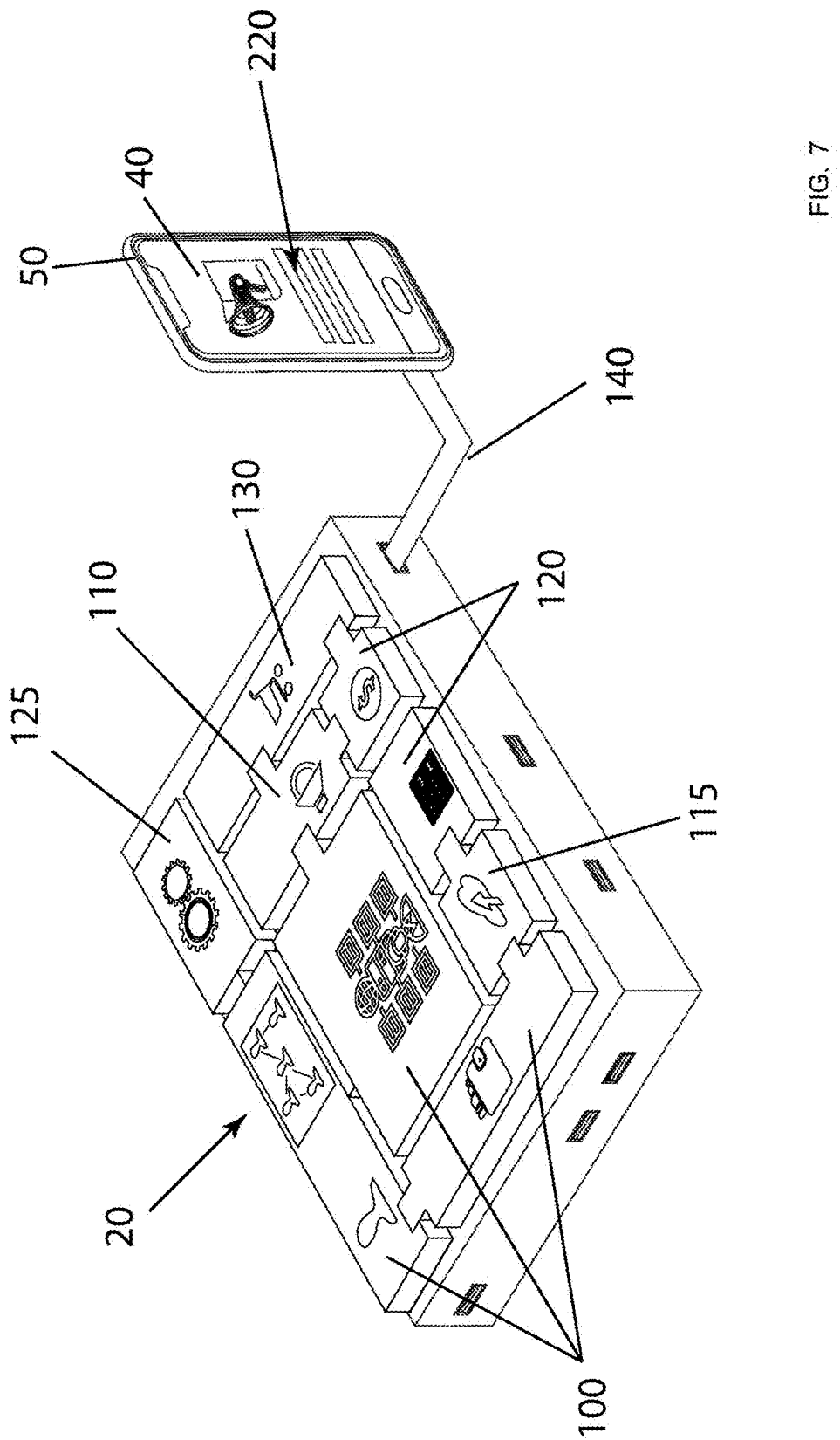
FIG. 7 illustrates a non-limiting diagram associated with a non-limiting interface of the software application including an alerts/notifications interface.

FIG. 7 shows in greater detail Segment 700 of FIG. 1 and, in particular, a further interface (220) associated with software application (40) for providing alerts and/or notifications to individuals (30) as well as artists (70). For example, notifications may be provided to pre-registered users regarding the receipt of streamed recordings of live performances of a particular artist (70) of interest, with pre-registered users (30) receiving the notifications by any means including push notification, SMS, email, etc. Likewise, artists (70) may receive notifications including where a particular recording that has been uploaded does not meet minimum quality standards, where the artists (70) may be requested to provide a further improved quality recording.

As used herein, the term "server", "system", "computer", "computing system" or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

The one or more processors as described herein are configured to execute a set of instructions that are stored in one or more data storage units or elements (such as one or more memories), in order to process data. For example, the one or more processors may include or be coupled to one or more memories. The data storage units may also store data or other information as desired or needed. The data storage units may be in the form of an information source or a physical memory element within a processing machine.

The set of instructions may include various commands that instruct the one or more processors to perform specific operations such as the methods and processes of the various non-limiting embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of non-limiting embodiments herein illustrate one or more control or processing units. It is to be understood that the processing or control units may represent circuits, circuitry, or portions thereof that may be implemented as hardware with associated instructions (eg., software stored on a tangible and non-transitory computer readable storage medium, such as a computer hard drive, ROM, RAM, or the like) that perform the operations described herein. The hardware may include state machine circuitry hardwired to perform the functions described herein. In some non-limiting embodiments, the hardware may include electronic circuits that include and/or are connected to one or more logic-based devices, such as microprocessors, processors, controllers, or the like.

In some non-limiting embodiments, the one or more processors may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in the figures or a described method.

It will be appreciated by persons skilled in the relevant field of technology that numerous variations and/or modifications may be made to the invention as detailed in the embodiments without departing from the spirit or scope of the invention as broadly described. The present embodiments are, therefore, to be considered in all aspects as illustrative and not restrictive.

Throughout this specification and claims which follow, unless the context requires otherwise, the word "comprise", and variations such as "comprises" and "comprising", will be understood to imply the inclusion of a stated feature or step, or group of features or steps, but not the exclusion of any other feature or step or group of features or steps.

The invention claimed is:

1. A computer-implemented method for providing high quality streams or playbacks of live performance recordings, the method comprising:

receiving, by one or more processors, original video and audio recordings of live performances of a plurality of artists;

automatically adjusting, by the one or more processors, each recording to improve video and/or audio to satisfy a quality threshold suitable for immersive streaming or playback using smart glasses;

receiving, by the one or more processors, a user request for a stream or playback of a particular video and audio recording of a live performance of an artist from the plurality of artists in a format suitable for replaying the stream or playback using smart glasses associated with the user, the smart glasses having a display unit configured to provide the user with a display of the video and audio recording that is streamed or played back using the smart glasses, and in response to the request, the one or more processors configured to communicate with the smart glasses to provide a limited stream or playback of the recording to the user seeking to view the performance using the smart glasses, the limited stream or playback representing the original recording;

requesting, by the one or more processors, a fee in exchange for providing an unlimited stream or playback of the recording representing the adjusted recording having improved video and/or audio that satisfies the quality threshold; and based upon confirmation that the fee has been paid by the user, providing, by the one or more processors, the unlimited stream or playback of the recording of the performance to the smart glasses associated with the user.

2. The method of claim 1, wherein when a stream of the video and audio recording is requested, the stream is provided to the smart glasses without copying and saving the recording onto a database associated with the smart glasses.

3. The method of claim 1, wherein when a playback of the video and audio recording is requested, the playback is provided to the smart glasses by enabling the smart glasses to download and save the playback onto a database associated with the smart glasses.

4. The method of claim 1, wherein the limited stream or playback is further restricted in respect of:

the time of the video and audio recording.

5. The method of claim 1, wherein the one or more processors are associated with a central server configured to communicate with one or more devices operable to execute a software application that enables communication with the central server, the one or more devices comprising one or more of:

the smart glasses worn by users to view streams or playbacks of video and audio recordings of live performances;

data communications devices associated with said users; and data communications devices and/or video and audio capture devices associated with said one or more artists.

6. The method of claim 5, wherein the video and audio recording is captured using the video and audio capture devices associated with the one or more artists and subsequently received by the central server and stored in a library of video and audio recordings.

7. The method according to of claim 6, further comprising indexing, by the one or more processors, the stored library of video and audio recordings such that each recording comprises a description that enables the recordings to be classified according to one or more of:

artist, location of the live performance, category of performance, number of streams requested by users, and number of playbacks requested by users.

8. The method of claim 7, further comprising:

providing, by the one or more processors, a searching facility that enables users to utilise their smart glasses and/or associated data communications devices to search for recorded live performances in the indexed library based on a search query.

9. The method of claim 8, further including generating search results in response to the search query.

10. The method of claim 9, wherein when the search query comprises one or more keywords, the search results comprise a subset of the stored video and audio recordings that have a description including one or more words, numbers, symbols or characters that substantially match the keyword(s) searched according to a similarity threshold.

11. The method of claim 8, wherein when the search query specifies a filter to be applied to the search results based on the classification of each recording, the search results comprise a subset of the stored video and audio recordings that are selected in accordance with the filter specified by the user.

12. The method of claim 1, wherein the stream is a live stream based on video and audio being recorded and subsequently streamed by the one or more processors in substantially real-time.

13. The method of claim 1, further comprising:

providing, by the one or more processors, notifications to smart glasses and/or data communications devices associated with users regarding the receipt of recordings of live performances.

14. The method of claim 13, wherein notifications are issued to smart glasses and/or data communications devices of users by one or more of:

smart glass display message, push notification, text message, and email.

15. The method of claim 1, wherein when a new recording is received, the recording is processed by implementing a cognitive modelling tool to automatically adjust the recording to improve video and/or audio quality for subsequent viewing on smart glasses.

16. The method of claim 1, further comprising:

generating, by the one or more processors, analytical data for each user which enables subsequent analysis of the data to determine one or more of:

most popular artists;

most popular performance categories;

most popular methods of viewing recordings;

most active users viewing streamed and/or played back recordings;

most active locations for viewing streams and/or playbacks; and profiles of viewing audiences regarding streamed and/or played back recordings of live performances.

17. The method of claim 16, wherein the analytical data comprises at least a geo-location and geographical movements of each user according to GPS location functionality associated with smart glasses and/or a data communications device of each user.

18. The method of claim 1, wherein the smart glasses comprise augmented reality 3D smart glasses.

19. A system for providing high quality streams or playbacks of live performance recordings, the system comprising one or more processors that:

receive original video and audio recordings of live performances of a plurality of artists;

automatically adjust each recording to improve video and/or audio to satisfy a quality threshold suitable for immersive streaming or playback using smart glasses;

receive a user request for a stream or playback of a particular video and audio recording of a live performance of an artist from the plurality of artists in a format suitable for replaying the stream or playback using smart glasses associated with the user, the smart glasses having a display unit configured to provide the user with a display of the video and audio recording that is streamed or played back using the smart glasses, and in response to the request, the one or more processors configured to communicate with the smart glasses to provide a limited stream or playback of the recording to the user seeking to view the performance using the smart glasses, the limited stream or playback representing the original recording;

request a fee in exchange for providing an unlimited stream or playback of the recording representing the adjusted recording having improved video and/or audio that satisfies the quality threshold; and based upon confirmation that the fee has been paid by the user, provide the unlimited stream or playback of the recording of the performance to the smart glasses associated with the user.

20. A non-transitory computer-readable medium that when executed on a computer, causes one or more processors of the computer to perform steps to provide high quality streams or playbacks of live performance recordings, comprising:

receiving original video and audio recordings of live performances of a plurality of artists;

automatically adjusting each recording to improve video and/or audio to satisfy a quality threshold suitable for immersive streaming or playback using smart glasses;

receiving a user request for a stream or playback of a particular video and audio recording of a live performance of an artist from the plurality of artists in a format suitable for replaying the stream or playback using smart glasses associated with the user, the smart glasses having a display unit configured to provide the user with a display of the video and audio recording that is streamed or played back using the smart glasses, and in response to the request, the one or more processors configured to communicate with the smart glasses to provide a limited stream or playback of the recording to the user seeking to view the performance using the smart glasses, the limited stream or playback representing the original recording;

requesting a fee in exchange for providing an unlimited stream or playback of the recording representing the adjusted recording having improved video and/or audio that satisfies the quality threshold; and based upon confirmation that the fee has been paid by the user, providing the unlimited stream or playback of the recording of the performance to the smart glasses associated with the user.

* * * * *